United States Patent [19]

Wozniak

[11] Patent Number: 4,824,700

[45] Date of Patent: Apr. 25, 1989

[54] PAINTABLE ADHESION PROMOTER SYSTEM FOR POLYVINYL CHLORIDE PLASTISOLS

[75] Inventor: Don S. Wozniak, Powell, Ohio

[73] Assignee: Sherex Chemical Company, Inc., Ohio

[21] Appl. No.: 158,568

[22] Filed: Feb. 22, 1988

Related U.S. Application Data

[62] Division of Ser. No. 902,936, Sep. 2, 1986.

[51] Int. Cl.$^4$ .............................................. B05D 3/02
[52] U.S. Cl. ................................... 427/379; 427/388.5; 427/409; 428/458; 428/463; 428/474.4
[58] Field of Search ............ 427/318, 409, 379, 388.5; 428/463, 474.4, 458

[56] References Cited

U.S. PATENT DOCUMENTS

| | | | |
|---|---|---|---|
| 4,064,092 | 12/1977 | Burroway et al. | 526/216 |
| 4,146,520 | 3/1979 | Bierwirth et al. | 525/180 |
| 4,254,006 | 3/1981 | Robertson | 524/509 |
| 4,362,770 | 12/1982 | Matloi et al. | 427/409 |
| 4,391,858 | 7/1983 | Batzill | 427/409 |
| 4,403,003 | 9/1983 | Backhouse | 427/409 |
| 4,456,507 | 6/1984 | Kivel et al. | 427/409 |
| 4,719,132 | 1/1988 | Porter, Jr. | 427/409 |
| 4,728,543 | 3/1988 | Kurauchi et al. | 427/409 |

FOREIGN PATENT DOCUMENTS

| | | | |
|---|---|---|---|
| 52-69446 | 6/1977 | Japan | 427/409 |
| 57-167251 | 10/1982 | Japan | 427/409 |
| 59-36573 | 2/1984 | Japan | 427/409 |
| 61-35883 | 2/1986 | Japan | 427/409 |
| 62-38278 | 2/1987 | Japan | 427/409 |
| 804516 | 11/1958 | United Kingdom | 427/409 |
| 821942 | 10/1959 | United Kingdom | 427/409 |
| 2171030 | 8/1986 | United Kingdom | 427/409 |

*Primary Examiner*—Joseph L. Schofer
*Assistant Examiner*—N. Sarofim
*Attorney, Agent, or Firm*—Scully, Scott, Murphy & Presser

[57] ABSTRACT

Disclosed is an improved plastisol composition comprising a finely-divided vinyl chloride polymer, filler, a primary plasticizer, and a polyaminoamide-polyimidazoline adhesion promoter. The improvement for overcoating said plastisol with an acid catalyzed topcoat comprises a plasticizer/promoter phase which comprises said primary plasticizer, said adhesion promoter, and an effective amount of a secondary plasticizer non-ionic solvent effective in solvating the adhesion promoter in the plasticizer/promoter phase. The plasticizer/promoter phase is pre-formed for addition with the remaining ingredient for the plastisol composition.

6 Claims, No Drawings

PAINTABLE ADHESION PROMOTER SYSTEM FOR POLYVINYL CHLORIDE PLASTISOLS

This application is a division of application Ser. No. 06/092,936 filed Sept. 2, 1986.

BACKGROUND OF THE INVENTION

The present invention relates to plastisols in general and in particular to improved adhesion promoter systems for polyvinyl chloride (PVC) plastisols.

Vinyl chloride homopolymers (PVC) and copolymers are widely used for the protection of metallic surfaces against corrosion, for adhering thin sheet metal constructions, and for sealing welded seams, particularly in the automotive industry. Such coatings principally are applied in the form of plasticized vinyl chloride polymers (plastisols) by a variety of techniques. Depending upon the viscosity of the PVC plastisol, its utilization can be characterized as a sealant, caulk, coating, adhesive, or other function.

Since resistance to corrosion is a prime prerequisite in dealing with metal parts, the PVC plastisol should adhere to the metal part with a fair degree of tenacity; otherwise, oxidation undercutting would result. Despite the ability to control the texture of the plastisol by suitable fillers and the color by the addition of suitable tinctorial pigments, of the PVC plastisol must be overcoated with a high performance, e.g. acrylic, topcoat, especially in automotive uses of the PVC plastisol. Uniformity in visual appearance dictates such overcoating requirement typically.

Another requirement of the PVC plastisol is that it be curable at short, low bake cycles. In fact, successful plastisols and organisols in the automotive industry are being called on today to be curable, dry to the touch, at baking temperatures of less than 300°, e.g. about 275° F., with oven residence times of about 20–30 minutes. Energy costs dictate such low temperature, short baking cycles. Further, successful plastisol and organisol formulations must be economic and expel a minimum of atmospheric pollutants.

While a variety of adhesion promoters have been proposed for PVC plastisols and organisols, most have suffered from a variety of drawbacks including cost, insufficient film flexibility, or the like. One class of adhesion promoters which appears to exhibit a good balance between cost, flexibility, and low temperature bake characteristics are polyaminoamide-polyimidazoline adhesion promoters, such as set forth in U.S. Pat. No. 4,146,520. Such adhesion promoters have enabled the formulation of advantageous PVC plastisols and organisols which can be baked at temperatures as low as about 250° F. Unfortunately, the plastisols and organisols containing such polyaminoamide-polyimidazole adhesion promoters are not readily overcoated with acid-catalyzed topcoats, especially high performance acid catalyzed acrylic automobile finishes. It is theorized that the amine value of the adhesion promoters interacts and renders ineffectual the acid catalyst in the topcoat, thus resulting in tacky films. While reduction of the level of the adhesion promoter can overcome such topcoat tackiness, loss of adhesion also can occur at such low adhesion promoter levels. Thus, there is a need in the art to enable the utilization of polyaminoamide-polyimidazoline adhesion promoters in low bake PVC plastisol and organisol compositions, yet provide the ability to overcoat such plastisols with acid catalyzed topcoats.

BROAD STATEMENT OF THE INVENTION

The present invention is addressed to the need in the art to retain advantageous low bake properties of PVC plastisols and their requisite good adhesion to metal, yet still be able to be coated wet-on-dry or wet-on-wet by acid catalyzed topcoats. Accordingly, the present invention is directed to plastisol compositions comprising finely-divided vinyl chloride polymer, filler, a primary plasticizer, a polyaminoamide-polyimidazoline adhesion promoter. The improvement of the present invention comprises a plasticizer/promoter phase comprising said primary plasticizer, said adhesion promoter, and an effective amount of a secondary plasticizer nonionic solvent effective in solvating said adhesion promoter in said plasticizer/promoter phase wherein the plasticizer/promoter phase is preformed for addition with the remaining ingredients of the plastisol composition. Suitable nonionic secondary plasticizer solvents include aromatic solvents and polyalkylene glycol ether solvents which are effective in solvating the polyaminoamide-polyimidazoline adhesion promoters.

Another aspect of the present invention involves the method for formulating the improved plastisol compositions wherein the plasticizer/promoter phase comprising the primary plasticizer, the adhesion promoter, and the secondary plasticizer nonionic solvent is pre-formed and then such phase added to the remaining ingredients of the plastisol composition.

Advantages of the present invention include the retention of low bake characteristics of the plastisol and the excellent adhesion characteristics of the plastisol. A further advantage is the ability to overcoat the plastisol wet-on-dry or wet-on-wet with an acid catalyzed topcoat (i.e. "paintability", for present purposes) which is dry to the touch at lower bake temperatures of about 250°–360° F., for example. A further advantage is the ability to exhibit the foregoing advantageous characteristics while retaining the flexibility of controlling the rheological characteristics of the plastisol. A further advantage is an improved plastisol composition which exhibits excellent controlled age characteristics. These and other advantages will be readily apparent to those skilled in the art based upon the disclosure contained herein.

DETAILED DESCRIPTION OF THE INVENTION

The polyaminoamide-polyimidazoline adhesion promoters are set forth in U.S. Pat. No. 4,146,520. Such adhesion promoters include condensation products formed between a polymerized fatty acid mixture and an excess of polyalkylene polyamine. Such adhesion promoters additionally include the foregoing condensation product further reacted with an aldehyde, a ketone, or an epoxy compound.

While not intending to be bound by theory, it appears that a significant quantity of the adhesion promoter migrates to the surface of the cured plastisol. While such migration does not adversely impact the performance of the plastisol, it does adversely affect the curability of acid catalyzed topcoats which then are applied to the wet (wet-on-dry) or dry (i.e. wet-on-dry) plastisol. It is believed that the amine value of the adhesion promoter reacts with the acid catalyst in the topcoat which means that the topcoat will not be fully cured at the recommended bake temperatures of about 300° F. or thereabouts. As noted above, such undesirable interaction can be mostly obviated by a reduction of the amount of adhesion promoter in the plastisol, though such reduction compromises the degree of adhesion achievable, so that this alternative is not commercially viable. The same holds true for increasing the amount of acid catalyst in the acid catalyzed topcoat.

One way of viewing the result of the invention is that the adhesion promoter is rendered more compatible or homogeneous in the plastisol so that it does not overconcentrate at the film surface. Accordingly, appropriate secondary plasticizer solvents or diluents should be effective in solvating the polyaminoamide-polyimidazoline adhesion promoters. Next, such secondary plasticizer solvents should be non-ionic. Solvents rich in amine value, for example, should be avoided even though they may effectively solvate the adhesion promoters as such solvents only contribute to the problem being solved. Accordingly, nonionic solvents are recommended.

Suitable nonionic solvents which solvate the adhesion promoter include aromatic solvents and polyalkylene glycol ether solvents. By "solvate", we mean that a clear, stable solution results upon the mixing of the nonionic solvent and the adhesion promoter, typically at room temperature though modeate heating may be employed. Suitable such nonionic solvents include, for example, monoisopropyl biphenyl, diethylene glycol monoethyl ether, diisopropyl biphenyl, phenylxyleyl ethane, butylated biphenyl, and the like and mixtures thereof. The proportion of the secondary plasticizer solvent is adjusted to accomplish its function in the formulation. Often, this means between about 10 and 70 phr nonionic solvent is used.

The remaining ingredients in the plastisol are conventional and include finely-divided polyvinyl chloride homopolymers or vinyl chloride copolymers, and often blends thereof. The primary plasticizer most often will be an alkyl phthlate such as dihexyl phthlate, diisodecyl phthlate, and the like. Alternatively, the primary plasticizer may be an alkyl adipate (e.g. di(2-ethyl hexyl) adipate) or the like. The plasticizer typically will range from about 20 to 200 phr (weight parts per 100 weight parts of PVC resin).

Additionally the plastisol will contain a filler for control of rheology, control of cost, and the like. Suitably fillers include, for example, calcium carbonate, glass (including hollow glass spheres), talc, chalk, barium sulfate, and the like. The fillers certainly affect paintability of the plastisol, though with the invention more flexibility in filler utilization is gained. The proportion of filler can range up to about 300 phr and the optimum will vary depending upon the type of PVC and plasticizer, and the rheology desired. Finally, thixotropic agents can be added to achieve certain plastisol rheologies and such agents include, for example, fumed silica, bentonite, metallic fatty acid soaps, and the like. Thixotropic agents typically are added in the range of about 1–5 phr.

In order to maximize the paintability of the plastisol (i.e. ability to coat the plastisol with an acid catalyzed topcoat), it has been determined that a pre-blend of adhesion promoter, primary plasticizer, and nonionic secondary plasticizer solvent should be made. Such plasticizer/promoter blend then is added to the remaining ingredients for forming the plastisol. Apparently, the formation of the plasticizer/plastisol blend is more effective in compatibilizing the adhesion promoter in the plastisol is "pushing" the plasticizer into the PVC particles. Regardless of the mechanism involved, it has been determined that paintability of plastisol becomes a routine achievement when the plasticizer/promoter blend is initially formed in making the plastisol composition.

The plastisol is dryable or curable at very low bake temperatures ranging on down to about 250°–275° F. The plastisol either can be baked and then topcoated (wet-on-dry) or the plastisol can be applied followed by the topcoat wherein both coatings then are cured in a single bake (wet-on-wet). In automotive applications, the plastisol typically is drawn down or applied onto a metal subsrate which has been primed with a corrosion-inhibiting coating. Typical topcoats include high performance acrylic topcoats which are cured by conventional acid catalysts.

The following examples show how the present invention has been practiced but should not be construed as limiting. All percentages and proportions are by weight unless expressly indicated. Also, all citations disclosed herein are incorporated expressly herein by reference.

EXAMPLES

EXAMPLE 1

The efficacy of polyaminoamide-polyimidazoline adhesion promoters in PVC plastisol formulations was demonstrated on the following general formulation.

TABLE 1

| Ingredient* | Amount (wt.-parts) |
| --- | --- |
| Occidental 6482 | 60 |
| Borden VC265 | 40 |
| Dihexyl phthlate (DHP) | 62.5 |
| Diisodecyl phthlate(DIDP) | 62.5 |
| CaCO$_3$ | 250 |

*Occidental 6482-A medium molecular weight PVC homopolymer, inherent viscosity 1.07 (ASTM D-1243), K Value(Fikenstscher)71, specific gravity 1.414 (ASTM D-792), gelatin temperature 163° F., 100% passes through a 325 mesh sieve, Occidental Chemical Corp., Pottstown, Pa.
Borden VC265-PVC copolymer plastisol blending resin containing 4% vinyl acetate, 33–40 micron avg. particle size powder, Borden, Inc., Columbus, Ohio.
CaCO$_3$—Atomite brand CaCO$_3$, 3 micron mean particle size, Thompson, Weineman and Company, Cartersville, Georgia.

Varying levels of adhesion promoter were utilized as follows:

TABLE 2

| Formulation No. | Wt. Parts |
| --- | --- |
| 204-65-1 | 10.17 |
| 204-65-2 | 7.13 |
| 204-65-3 | 4.75 |
| 204-65-4 | 3.56 |
| 204-65-5 | 2.38 |
| 204-65-6 | 1.19 |
| 204-65-7 | 0.59 |

The adhesion promoter was Euretek 580 polyaminoamide adhesion promoter (amine value of 190, manufactured under U.S. Pat. No. 4,146,520, Sherex Chemical Company, Inc., Dublin, Ohio).

Brookfield viscosity measurements were taken on each formulation initially and thereafter at various intervals of time. The following data was recorded.

TABLE 3

| No. | RPM | Viscosity (cps) | | | | | | |
|---|---|---|---|---|---|---|---|---|
| | | Initial | 3 days | 7 days | 17 days | 24 days | 32 days | 45 days |
| 1 | 2.5 | 154,800 | 267,200 | 350,400 | 334,400 | 348,800 | 339,200 | 324,800 |
| | 5 | 99,400 | 184,800 | 249,600 | 254,400 | 255,200 | 244,800 | 232,800 |
| | 10 | 66,600 | 125,600 | 174,800 | 177,200 | 178,800 | 176,400 | 165,600 |
| | 20 | 47,350 | 91,800 | 129,000 | 130,600 | 133,000 | 134,600 | 125,600 |
| | R | 3.27 | 2.91 | 2.72 | 2.56 | 2.62 | 2.52 | 2.59 |
| | yield | 2,770 | 4,120 | 5,040 | 4,000 | 4,680 | 4,720 | 4,500 |
| 2 | 2.5 | 143,200 | 283,200 | 302,400 | 304,000 | 272,000 | 267,200 | 275,200 |
| | 5 | 91,600 | 188,800 | 199,200 | 209,600 | 175,200 | 177,600 | 185,600 |
| | 10 | 59,300 | 122,800 | 130,000 | 138,800 | 117,600 | 119,600 | 124,800 |
| | 20 | 40,800 | 85,600 | 90,800 | 97,400 | 84,800 | 87,200 | 90,800 |
| | R | 3.58 | 3.31 | 3.33 | 3.12 | 3.21 | 3.06 | 3.03 |
| | yield | 2,580 | 4,720 | 5,160 | 4,720 | 4,840 | 4,480 | 4,480 |
| 3 | 2.5 | 214,400 | 276,800 | 312,000 | 313,600 | 324,800 | 262,400 | 244,800 |
| | 5 | 137,600 | 171,200 | 192,800 | 197,600 | 205,600 | 164,800 | 152,800 |
| | 10 | 87,200 | 106,400 | 120,400 | 126,400 | 134,800 | 105,600 | 98,400 |
| | 20 | 57,200 | 69,200 | 78,000 | 85,800 | 93,800 | 72,600 | 65,400 |
| | R | 3.75 | 4.00 | 4.00 | 3.66 | 3.46 | 4.47 | 3.74 |
| | yield | 3,840 | 5,280 | 5,960 | 5,800 | 5,960 | 4,880 | 4,600 |
| 4 | 2.5 | 228,800 | 320,000 | 342,400 | 328,000 | 307,200 | 270,400 | 276,800 |
| | 5 | 147,200 | 200,800 | 212,800 | 203,200 | 189,600 | 168,800 | 173,600 |
| | 10 | 93,600 | 124,800 | 133,200 | 127,600 | 118,400 | 105,600 | 109,600 |
| | 20 | 61,200 | 80,600 | 88,400 | 83,600 | 78,400 | 70,200 | 73,600 |
| | R | 3.74 | 3.97 | 3.87 | 3.92 | 3.92 | 3.85 | 1.59 |
| | yield | 4,080 | 5,960 | 6,480 | 6,240 | 5,880 | 5,080 | 5,000 |
| 5 | 2.5 | 275,200 | 347,200 | 315,200 | 328,000 | 310,400 | 289,600 | 276,800 |
| | 5 | 177,600 | 216,800 | 189,600 | 202,400 | 192,000 | 178,400 | 173,600 |
| | 10 | 113,200 | 134,000 | 114,000 | 124,800 | 119,200 | 109,600 | 109,200 |
| | 20 | 73,200 | 85,800 | 73,600 | 80,400 | 76,800 | 71,400 | 72,800 |
| | R | 3.76 | 4.05 | 4.28 | 4.08 | 4.04 | 4.06 | 3.40 |
| | yield | 4,880 | 6,520 | 6,280 | 6,280 | 5,920 | 5,560 | 5,160 |
| 6 | 2.5 | 345,600 | 398,400 | 361,600 | 342,400 | 360,000 | 342,400 | 318,400 |
| | 5 | 245,600 | 246,400 | 224,000 | 208,800 | 218,400 | 209,600 | 197,600 |
| | 10 | 158,400 | 150,800 | 136,400 | 127,200 | 131,600 | 126,800 | 120,800 |
| | 20 | 99,800 | 93,600 | 84,800 | 78,800 | 82,200 | 78,800 | 75,600 |
| | R | 3.46 | 4.26 | 4.26 | 4.35 | 4.38 | 4.35 | 4.21 |
| | yield | 5,000 | 7,600 | 6,880 | 6,680 | 7,080 | 6,640 | 6,040 |
| 7 | 2.5 | 387,200 | 449,600 | 420,700 | 424,000 | 414,400 | 392,000 | 395,200 |
| | 5 | 274,400 | 276,800 | 250,400 | 253,600 | 247,200 | 231,200 | 235,200 |
| | 10 | 171,200 | 165,200 | 147,200 | 150,400 | 146,800 | 137,200 | 140,000 |
| | 20 | 104,800 | 98,800 | 90,000 | 91,400 | 88,800 | 82,600 | 86,200 |
| | R | 3.69 | 4.55 | 4.68 | 4.64 | 4.67 | 4.75 | 4.58 |
| | yield | 5,640 | 8,640 | 8,520 | 8,520 | 8,360 | 8,040 | 8,040 |

*Spindle #6 for 204-65-1 and 2, and Spindle #7 for all other samples.
R is a measure of the degree of thixotropy and is calculated by dividing the viscosity at 2.5 rpm by the viscosity at 20 rpm.
Yield is a measure of the force required to move the plastisol (thickness of the plastisol) and is calculated as follows:
$$\frac{(2)(2.5 \text{ rpm}) (\text{Viscosity at 2.5 rpm} - \text{Viscosity at 5 rpm})}{100}$$

Advantageously, the viscosity should stabilize over time. The above-tabulated data demonstrates such viscosity stability.

Each formulation was drawn down (0.020 inch coating) or primed steel panels (Uni-Prime coated panels, PPG Industries, used in all examples) and baked for 20 minutes at 121° C. Each coating had good adhesion to the panels except for 204-65-7, indicating that the promoter level was too low.

The coated panels then were coated with a white enamel paint (an automotive topcoat based on melamine and a hydroxyl-acrylic resin with an acid catalyst, supplied by PPG Industries, Pittsburgh, Pa.) The topcoated panels were baked at 121° C. for 30 minutes. All samples were slightly tacky and eventually intercoat adhesion was lost (about 50 days). This demonstrates the difficulties encountered in curing an acid catalyzed topcoat over a primer higher in amine value. Thus, while metal adhesion and controlled age viscosity were good, paintability was lacking.

EXAMPLE 2

Plasticizer studies extended to various blends in order to retain control age viscosity but improve paintability. The basic formulation studies was as follows:

TABLE 4

| Ingredient* | Amount (wt.-parts) |
|---|---|
| Occidental 6482 | 60 |
| Borden VC265 | 40 |
| CaCO$_3$ | 100 |
| Talc | 20 |
| Silica | 1 |
| Euretek 580 promoter | 3.21 phr |

Talc - Mistron ZCS grade talc, Cypress Industrial Minerals
Silica - Cab-O-Sil brand fumed silica, Cabot Corporation.
Promotor - phr is weight parts per hundred weight parts of PVC.

The various plasticizer/promoter phases evaluated are set forth below:

TABLE 5

| Ingredient | Formulation No. 204-88 (wt.-parts) | | | | | |
|---|---|---|---|---|---|---|
| | 1 | 2 | 3 | 4 | 5 | 6 |
| DIHP | 50 | 50 | 50 | 50 | 50 | 50 |
| DHP | 10 | 20 | 25 | 50 | 50 | 100 |
| Monoiso- | 40 | 30 | 25 | — | — | 40 |

TABLE 5-continued

| | Formulation No. 204-88 (wt.-parts) | | | | | |
|---|---|---|---|---|---|---|
| Ingredient | 1 | 2 | 3 | 4 | 5 | 6 |
| propyl biphenyl | | | | | | |

In formulations 1–3 and 5, the promoter was added to the plasticizer mix slightly warmed until homogeneous. In formulations 4 and 6, the promoter was added after the plastisol was made. Age viscosity measurements were taken as set forth below.

TABLE 6

| | | Viscosity (cps) | | | | |
|---|---|---|---|---|---|---|
| No. | RPM | Initial | 1 day | 4 days | 11 days | 22 days | 34 days |
| 1 | 2.5 | 217,600 | 188,800 | 273,600 | 236,800 | 251,200 | 244,800 |
| | 5 | 128,800 | 113,600 | 179,200 | 154,400 | 172,000 | 174,400 |
| | 10 | 79,600 | 69,600 | 111,600 | 101,200 | 119,600 | 118,800 |
| | 20 | 50,800 | 46,800 | 74,400 | 69,000 | 84,200 | 85,800 |
| | R | 4.28 | 4.03 | 3.68 | 3.43 | 2.98 | 2.85 |
| | yield | 4,440 | 3,760 | 4,720 | 4,120 | 3,960 | 3,520 |
| 2 | 2.5 | 224,000 | 212,800 | 212,400 | 300,800 | 304,000 | 308,800 |
| | 5 | 132,800 | 126,400 | 165,600 | 201,600 | 212,000 | 211,200 |
| | 10 | 80,800 | 77,600 | 105,200 | 141,600 | 150,400 | 148,800 |
| | 20 | 50,800 | 49,400 | 69,600 | 103,600 | 115,800 | 117,400 |
| | R | 4.41 | 4.31 | 3.77 | 2.91 | 2.63 | 2.63 |
| | yield | 4,560 | 4,320 | 4,840 | 4,960 | 4,600 | 4,880 |
| 3 | 2.5 | 220,800 | 192,000 | 241,600 | 246,400 | 275,200 | 275,200 |
| | 5 | 122,400 | 115,200 | 148,000 | 153,600 | 172,800 | 180,800 |
| | 10 | 73,200 | 70,400 | 93,600 | 97,200 | 113,200 | 25,200 |
| | 20 | 46,000 | 45,600 | 63,600 | 65,600 | 77,200 | 88,800 |
| | R | 4.80 | 4.21 | 3.80 | 3.76 | 3.56 | 3.10 |
| | yield | 4,920 | 3,840 | 4,680 | 4,640 | 5,120 | 4,720 |
| 4 | 2.5 | 217,600 | 214,400 | 227,200 | 235,200 | 233,600 | 246,400 |
| | 5 | 131,200 | 128,800 | 139,200 | 140,800 | 139,200 | 150,400 |
| | 10 | 81,600 | 79,600 | 85,600 | 86,000 | 86,800 | 95,200 |
| | 20 | 51,400 | 50,800 | 54,600 | 56,200 | 56,400 | 63,400 |
| | R | 4.23 | 4.22 | 4.16 | 4.19 | 4.14 | 3.89 |
| | yield | 4,320 | 4,280 | 4,400 | 4,720 | 4,720 | 4,800 |
| 5 | 2.5 | 230,400 | 204,800 | 214,400 | 212,800 | 217,600 | 217,600 |
| | 5 | 139,200 | 125,600 | 130,400 | 128,800 | 131,200 | 132,800 |
| | 10 | 85,600 | 78,400 | 81,600 | 79,200 | 81,600 | 82,400 |
| | 20 | 53,800 | 50,800 | 52,600 | 51,200 | 51,600 | 53,400 |
| | R | 4.28 | 4.03 | '4.08 | 4.16 | 4.22 | 4.07 |
| | yield | 4,560 | 3,960 | 4,200 | 4,200 | 4,320 | 4,240 |
| 6 | 2.5 | 193,600 | 204,800 | 225,600 | 196,800 | 249,600 | 254,400 |
| | 5 | 124,800 | 128,800 | 138,400 | 122,400 | 156,800 | 161,600 |
| | 10 | 75,200 | 78,400 | 85,600 | 74,800 | 08,000 | 109,600 |
| | 20 | 46,200 | 50,000 | 54,600 | 51,600 | 64,800 | 70,600 |
| | R | 4.19 | 4.09 | 4.13 | 3.81 | 3.85 | 3.32 |
| | yield | 3,440 | 3,800 | 4,360 | 3,720 | 4,640 | 4,640 |

Spindle #7 for all samples.

Coatings on primed steel panels (0.020 inch thickness) were baked at 121° C. for 20 minutes. All films adhered well except No. 204-88-5 (control). The acid catalyst topcoat of Example 1 was applied over the cured plastisols and baked at 121° C. for 30 minutes (wet-on-dry). Nos. 1–3 were dry while Nos. 4 and 5 were slightly tacky. Thus, the paintability of the plastisol had been improved by the addition of the secondary plasticizer solvent, monoisopropyl biphenyl. The amount of secondary plasticizer solvent appeared to be a bit low in Nos. 2 and 3, so that the formulation of this example appears to require at least about 40 weight parts of monoisopropyl biphenyl in order for paintability to be realized.

EXAMPLE 3

The basic formulation of Example 2 (Table 4) was studied again at higher levels of monoisopropyl biphenyl: 50 wt.-parts for 204-96-1 and 70 wt.-parts for 204-96-2. Again, the technique of blending the adhesion promoter into the plasticizer blend prior to making the plastisol was utilized. The age viscosity data recorded is set forth below.

TABLE 7

| | | Viscosity (cps) | | | | | | |
|---|---|---|---|---|---|---|---|---|
| No. | RPM | Initial | 1 day | 6 days | 14 days | 21 days | 30 days | 45 days |
| 1 | 2.5 | 142,000 | 161,600 | 172,000 | 174,400 | 815,600 | 195,200 | 180,000 |
| | 5 | 86,600 | 99,200 | 106,400 | 115,200 | 120,800 | 126,400 | 111,400 |
| | 10 | 55,100 | 62,900 | 67,800 | 74,400 | 78,800 | 84,000 | 71,700 |
| | 20 | 36,350 | 41,650 | 46,200 | 48,200 | 52,800 | 56,600 | 47,100 |
| | R | 3.91 | 3.88 | 3.725 | 3.62 | 3.52 | 3.45 | 3.77 |
| | yield | 2,770 | 3,120 | 3,280 | 2,960 | 3,240 | 3,440 | 3,430 |
| 2 | 2.5 | 174,400 | 118,400 | 105,600 | 124,800 | 134,400 | 140,800 | 163,200 |
| | 5 | 115,600 | 105,600 | 98,400 | 101,600 | 104,400 | 123,200 | 122,400 |
| | 10 | 74,700 | 88,400 | 90,400 | 96,400 | 98,800 | 99,200 | 101,600 |
| | 20 | 48,300 | 64,800 | 69,200 | 79,200 | 81,600 | 77,400 | 82,400 |
| | R | 3.61 | 1.83 | 1.33 | 1.58 | 1.65 | 1.82 | 1.98 |
| | yield | 2,940 | 640 | 360 | 1,160 | 1,000 | 880 | 2,040 |

Spindle #6 for Initial, 1 day, and 6 days for No. 1 and for Initial for No. 2;
Spindle #7 for all other samples.

Each plastisol exhibited good adhesion to the steel panels (bake protocol of 121° C. for 20 minutes). The acid catalyzed topcoat of Example 1 was applied wet-on-dry and wet-on-wet baking at 121° C. for 30 minutes for both. The topcoat was not tacky for both systems. Note the slightly increased secondary solvent levels used compared to Example 2. Thus, the ability to achieve paintability while retaining adhesion to metal has been achieved.

EXAMPLE 4

The following formulations were studied.

TABLE 8

| | Formulation No. 204-147 | |
|---|---|---|
| | (wt-parts) | |
| Ingredient | 1 | 2 |
| Occidental 6482 | 60 | 60 |
| Borden VC265 | 40 | 40 |
| CaCO$_3$ | 200 | 200 |
| Talc | 10 | 10 |
| DIDP | 60 | 60 |
| Monoisopropyl biphenyl | 40 | 40 |
| Euretek 580 promoter | 3 | 3 |

The plasticizer/promoter blend of No. 1 was mixed at room temperature and then added to the plastisol. The plasticizer/promoter blend of No. 2 was mixed at 72° C. and then added to the plastisol. The effects of temperature during the formulating, thus, were being studied.

Both plastisols were coated on steel panels and subjected to wet-on-dry and wet-on-wet topcoating as in Example 3. No apparent performance difference between the two formulations observed.

EXAMPLE 5

Various secondary plasticizer solvents were studied utilizing the basic formulation of Example 2. The various plasticizer blends studied are set forth below:

TABLE 9

| | Formulation No. 204-98 | | |
|---|---|---|---|
| | | (wt.-parts) | |
| Ingredient | 1 | 2 | 3 |
| DIDP | 50 | 50 | 50 |
| DHP | 10 | 10 | 10 |
| Butylated biphenyl | 40 | — | — |
| Diisopropyl biphenyl | — | 40 | — |
| Phenylxyleyl ethane | — | — | 40 |

The plasticizer/promoter blends were made and then added to the remaining ingredients, as described above. Age viscosity data are set forth below.

TABLE 9

| | | Viscosity (cps) | | | | |
|---|---|---|---|---|---|---|
| No. | RPM | Initial | 6 days | 14 days | 30 days | 45 days |
| 1 | 2.5 | 212,800 | 198,400 | 190,400 | 201,600 | 185,600 |
| | 5 | 147,200 | 120,800 | 113,600 | 121,600 | 111,200 |
| | 10 | 96,000 | 74,800 | 70,400 | 75,600 | 69,600 |
| | 20 | 62,400 | 48,200 | 45,400 | 50,600 | 45,000 |
| | R | 3.41 | 4.12 | 4.19 | 3.98 | 4.12 |
| | yield | 3,280 | 3,880 | 3,840 | 4,000 | 3,720 |
| 2 | 2.5 | 259,200 | 225,600 | 206,400 | 214,400 | 206,400 |
| | 5 | 172,000 | 136,800 | 124,800 | 131,200 | 123,200 |
| | 10 | 106,800 | 84,800 | 76,400 | 82,000 | 77,200 |
| | 20 | 68,200 | 54,400 | 50,600 | 55,400 | 50,800 |
| | R | 3.80 | 4.15 | 4.08 | 3.87 | 4.06 |
| | yield | 4,360 | 4,440 | 4,080 | 4,160 | 4,160 |
| 3 | 2.5 | 171,200 | 195,200 | 195,200 | 188,800 | 190,400 |
| | 5 | 143,200 | 125,600 | 120,800 | 117,600 | 121,600 |
| | 10 | 98,800 | 78,000 | 75,600 | 71,200 | 74,800 |
| | 20 | 64,000 | 51,600 | 50,800 | 47,200 | 49,600 |
| | R | 2.68 | 3.78 | 3.84 | 4.00 | 3.84 |
| | yield | 1,400 | 3,480 | 3,720 | 3,560 | 3,440 |

Spindle #7 for all samples.

The formulations were coated and cured on steel panels (121° C. for 20 minutes) and topcoated wet-on-dry and wet-on-wet as in the previous examples. Again, good adhesion to the substrates was achieved. The wet-on-dry topcoats also were tack free while the wet-on-wet topcoats were very slightly tacky. Thus, the efficacy of additional aromatic secondary plasticizer solvents is demonstrated.

EXAMPLE 6

The following formulations were made as described above.

TABLE 10

| | Formulation no. 204-116 | | | |
|---|---|---|---|---|
| | | (wt.-parts) | | |
| Ingredient | 1 | 2 | 3 | 4 |
| Occidental 6482 | 60 | 60 | 60 | 60 |
| Borden VC265 | 40 | 40 | 40 | 40 |
| CaCO3 | 200 | 200 | 200 | 200 |
| DIDP | 60 | 60 | 60 | 30 |
| DHP | — | — | — | 30 |
| Euretek 580 promoter | 5 | 3 | 3 | 3 |
| Monoisopropyl biphenyl | 40 | 40 | — | — |
| Diethylene glycol monoethyl ether | — | — | 40 | 40 |

Control age viscosity data recorded is set forth below.

TABLE 11

| | | Viscosity (cps) | | | | |
|---|---|---|---|---|---|---|
| No. | RPM | Initial | 3 days | 14 days | 25 days | 31 days |
| 1 | 2.5 | 211,200 | 206,400 | 233,600 | 241,600 | 284,800 |
| | 5 | 171,200 | 196,800 | 220,800 | 215,200 | 237,600 |
| | 10 | 115,200 | 153,200 | 175,600 | 164,400 | 180,800 |
| | 20 | 79,600 | 106,600 | 126,400 | 121,600 | 137,600 |
| | R | 2.65 | 1.94 | 1.85 | 1.99 | 2.07 |
| | yield | 2,000 | 480 | 640 | 1,320 | 2,360 |
| 2 | 2.5 | 219,200 | 256,000 | 262,400 | 278,400 | 281,600 |
| | 5 | 144,000 | 211,200 | 228,800 | 246,400 | 231,200 |
| | 10 | 98,400 | 153,600 | 169,200 | 180,000 | 172,400 |
| | 20 | 60,600 | 109,400 | 115,400 | 132,400 | 124,200 |
| | R | 3.62 | 2.34 | 2.27 | 2.10 | 2.27 |
| | yield | 3,760 | 2,240 | 1,680 | 1,600 | 2,520 |
| 3 | 2.5 | 6,240 | 15,520 | 33,200 | 33,200 | 34,400 |
| | 5 | 5,040 | 12,080 | 23,200 | 25,000 | 25,600 |
| | 10 | 4,320 | 9,760 | 17,800 | 20,400 | 20,500 |
| | 20 | 3,860 | 8,120 | 14,600 | 16,550 | 16,750 |
| | R | 1.62 | 1.91 | 2.27 | 2.00 | 2.05 |
| | yield | 60 | 172 | 500 | 410 | 440 |
| 4 | 2.5 | 5,440 | 15,360 | 32,800 | 40,400 | 44,800 |
| | 5 | 4,480 | 12,240 | 25,000 | 31,400 | 34,800 |
| | 10 | 3,840 | 10,160 | 20,200 | 25,600 | 28,100 |
| | 30 | 3,340 | 8,920 | 17,050 | 21,950 | 23,850 |
| | R | 1.63 | 1.72 | 1.92 | 1.84 | 1.88 |
| | yield | 48 | 156 | 390 | 450 | 500 |

Spindle #7 for No. 1 and No. 2; Spindle #5 for Initial and 3 days for No. 3 and No. 4;
Spindle #6 for remaining samples.

The plastisols were coated on panels (121° C. for 20 minutes) and topcoated wet-on-dry as described in the previous examples. Again, good substrate adhesion was achieved. The topcoats were dry for Nos. 2, 3, and 4, and only very slightly tacky for No. 1. Again, the low temperature paintability of the inventive plastisols is demonstrated.

EXAMPLE 7

Additional studies of the ether secondary plasticizer solvent were undertaken on the following formulations.

TABLE 12

| | Formulation No. 204-98 | | |
|---|---|---|---|
| | | (wt.-parts) | |
| Ingredient | 1 | 2 | 3 |
| Occidental 6482 | 60 | 60 | 60 |
| Borden VC265 | 40 | 40 | 40 |
| CaCO3 | 200 | 200 | 200 |
| DIDP | 90 | 80 | 105 |
| Diethyleneglycol monoethyl ether | 10 | 20 | 20 |
| Euretek 580 promoter | 3 | 3 | 3 |

Control age viscosity data is set forth below.

TABLE 13

| | | Viscosity (cps) | | | | | |
|---|---|---|---|---|---|---|---|
| No. | RPM | Initial | 1 day | 3 days | 10 days | 21 days | 24 days |
| 1 | 2.5 | 128,800 | 170,400 | 249,600 | 283,200 | 267,200 | 254,400 |
| | 5 | 78,600 | 104,000 | 151,200 | 177,600 | 167,200 | 158,400 |
| | 10 | 50,200 | 66,400 | 96,400 | 114,400 | 108,400 | 102,400 |
| | 20 | 33,950 | 44,900 | 63,200 | 79,200 | 74,800 | 70,800 |
| | R | 3.79 | 3.80 | 3.95 | 3.58 | 3.57 | 3.59 |
| | yield | 2,510 | 3,320 | 4,920 | 5,280 | 5,000 | 4,800 |
| 2 | 2.5 | 65,600 | 98,400 | 135,200 | 161,200 | 170,800 | 164,800 |
| | 5 | 40,200 | 59,400 | 82,400 | 96,800 | 106,600 | 100,200 |
| | 10 | 25,600 | 38,200 | 52,600 | 63,800 | 69,700 | 64,900 |
| | 20 | 17,700 | 25,800 | 36,000 | 45,050 | 47,350 | 44,950 |
| | R | 3.71 | 3.82 | 3.76 | 3.58 | 3.61 | 3.67 |
| | yield | 1,270 | 1,950 | 2,640 | 3,220 | 3,210 | 3,230 |
| 3 | 2.5 | 35,680 | 59,520 | 82,720 | 109,600 | 105,600 | 101,200 |
| | 5 | 20,880 | 35,360 | 48,960 | 65,200 | 63,600 | 60,400 |
| | 10 | 18,000 | 22,080 | 30,240 | 40,300 | 39,600 | 37,300 |

TABLE 13-continued

| No. | RPM | Viscosity (cps) | | | | | |
|---|---|---|---|---|---|---|---|
| | | Initial | 1 day | 3 days | 10 days | 21 days | 24 days |
| | 20 | 8,620 | 14,500 | 19,600 | 26,300 | 26,200 | 24,600 |
| | R | 4.14 | 4.10 | 4.22 | 4.17 | 4.03 | 4.11 |
| | yield | 740 | 1,208 | 1,688 | 2,220 | 2,100 | 2,040 |

Spindle #6 for No. 1 and No. 2; Spindle #5 for No. 3.

Good adhesion to steel panels again was achieved. The wet-on-dry topcoats (121° C. for 30 minutes) also were dry. The efficacy of the ether secondary plasticizer solvent again is demonstrated.

EXAMPLE 8

Formulation No. 204-118-1 (Example 7) was evaluated again along with an equivalent formulation which used a different adhesion promoter (No. 2) at the same level: Euretek 555 polyaminoamide-polyimidazole adhesion promoter (amine value of 380; Gardner color of 12: 8.1 lb/gal. at 82.2° C.; Viscosity profile (Brookfield LVT, spindle 34) of 17,000 cps at 43.3° C., 13,000 cps at 48.9° C., 9,000 cps at 54.5° C., 4,000 cps at 60.0° C., and 2,800 cps at 65.6° C.; Sherex Chemical Company, Inc., Dublin, Ohio). The control age viscosity data recorded is set forth below.

TABLE 14

| No. | RPM | Viscosity (cps) | | | | | |
|---|---|---|---|---|---|---|---|
| | | Initial | 1 day | 3 days | 10 days | 21 days | 24 days |
| 1 | 2.5 | 128,800 | 170,400 | 249,600 | 283,200 | 267,200 | 254,400 |
| | 5 | 78,600 | 104,000 | 151,200 | 177,600 | 167,200 | 158,400 |
| | 10 | 50,200 | 66,400 | 96,400 | 114,400 | 108,400 | 102,400 |
| | 20 | 33,950 | 44,900 | 63,200 | 79,200 | 74,800 | 70,800 |
| | R | 3.79 | 3.80 | 3.95 | 3.58 | 3.57 | 3.59 |
| | yield | 2,510 | 3,320 | 4,920 | 5,280 | 5,000 | 4,800 |
| 2 | 2.5 | 130,800 | 145,600 | 185,600 | 154,800 | 154,800 | |
| | 5 | 82,000 | 87,800 | 93,600 | 94,600 | 95,800 | |
| | 10 | 52,700 | 55,700 | 59,800 | 61,400 | 62,600 | |
| | 20 | 35,650 | 37,900 | 41,950 | 42,600 | 43,800 | |

See Example 7 for No. 1; Spindle #6 for No. 2.

Panel coatings and wet-on-dry acid catalyzed topcoats were applied as in the previous examples. Good panel adhesion was achieved. The topcoat on Formulation No. 204-118-1 was dry while the topcoat of Formulation No. 204-126-2 was only slightly tacky.

EXAMPLE 9

The following formulations were made:

TABLE 15

| | Formulation No. 204-120 | | |
|---|---|---|---|
| | (wt.-parts) | | |
| Ingredient | 1 | 2 | 3 |
| Occidental 6482 | 60 | 60 | 60 |
| Borden VC265 | 40 | 40 | 40 |
| CaCO₃ | 200 | 200 | 200 |
| DIDP | 90 | 80 | 55 |
| Diethylene glycol monoethyl ether | 10 | 20 | 20 |
| Euretek 580 promoter | 3 | 3 | 3 |

Control age viscosity data is set forth below.

TABLE 16

| No. | RPM | Viscosity (cps) | | | |
|---|---|---|---|---|---|
| | | Initial | 1 day | 10 days | 21 days |
| 1 | 2.5 | 108,800 | 158,400 | 334,400 | 318,400 |
| | 5 | 66,600 | 96,800 | 212,800 | 203,200 |
| | 10 | 43,300 | 61,600 | 137,600 | 131,200 |
| | 20 | 30,000 | 41,600 | 92,800 | 90,800 |

TABLE 16-continued

| No. | RPM | Viscosity (cps) | | | |
|---|---|---|---|---|---|
| | | Initial | 1 day | 10 days | 21 days |
| | R | 3.63 | 3.81 | 3.60 | 3.51 |
| | yield | 2,110 | 3,080 | 6,080 | 5,760 |
| 2 | 2.5 | 20,400 | 44,000 | 225,600 | 249,600 |
| | 5 | 13,400 | 27,600 | 136,800 | 150,400 |
| | 10 | 10,200 | 18,900 | 86,800 | 10,800 |
| | 20 | 7,850 | 13,800 | 56,600 | 71,200 |
| | R | 2.60 | 3.19 | 3.99 | 3.51 |
| | yield | 350 | 820 | 4,440 | 4,960 |
| 3 | 2.5 | 22,800 | 40,000 | 313,600 | 304,000 |
| | 5 | 19,000 | 32,200 | 217,600 | 202,400 |
| | 10 | 16,300 | 26,100 | 110,400 | 137,600 |
| | 20 | 14,700 | 22,950 | 81,400 | 102,800 |
| | R | 1.55 | 1.83 | 3.85 | 2.96 |
| | yield | 190 | 490 | 4,800 | 5,080 |

Spindle #6 for Initial and 1 day; Spindle #7 for all other samples.

Panel and topcoat testing revealed that good panel adhesion still was present but that the wet-on-dry topcoats (121° C. for 30 minutes) were slightly tacky. The reason for the diminution in performance of this butyl ether solvent compared to the ethyl ether version is not understood presently.

EXAMPLE 10

The following formulations were made.

| | Formulation No. 204 | | | | | |
|---|---|---|---|---|---|---|
| | (wt.-parts) | | | | | |
| Ingredient* | 103-1 | 103-2 | 105-1 | 105-2 | 138-1 | 138-2 |
| Occidental 6482 | 60 | 60 | 60 | 60 | 60 | 60 |
| Borden VC265 | 40 | 40 | 40 | 40 | 40 | 40 |
| CaCO₃ | 100 | 100 | 100 | 100 | 200 | 200 |
| Talc | 20 | 20 | 20 | 20 | — | — |
| Silica | 1 | 1 | 1 | 1 | — | — |
| DIDP | 30 | 20 | 50 | 30 | 90 | 80 |
| DHP | 30 | 20 | 25 | 30 | — | — |
| Monoisopropyl biphenyl | 20 | 30 | — | — | — | — |
| Propylene glycol dibenzoate | 20 | 30 | — | — | — | — |
| Ethyl toluene sulfon amide (ortho and para isomer mixture) | — | — | 25 | 40 | — | — |
| Ethoxylated nonyl phenol | — | — | — | — | 10 | 20 |

*Euretek 580 promoter added at 1% by weight in all formulations.
Ethoxylated nonyl phenol-Igepal CO-630 nonylphenoxy poly(ethyleneoxy) ethanol, GAF Corporation.

While the aromatic ester, the sulfonamide, and the nonyl phenol solvents all solvated the adhesion promoter, wet-on-dry paintability was lacking. Ester solvents appear not to be beneficial due to postulated undesirable interaction with other ingredients. The sulfonamide solvent adds more amine value to the plastisol whidh is not desirable for achieving cure of the acid catalyzed topcoat. The ethoxylated nonyl phenol solvent should have functioned properly according to current understanding of the invention. Perhaps different levels or degrees of ethoxylation will enable this solvent to function is plastisol.

I claim:
1. A method for coating a metal substrate which comprises:
(a) applying a plastisol composition comprising a finely-divided vinyl chloride polymer, filler, a primary plasticizer, and a polyaminoamide-polyimidazoline adhesion promoter, said plastisol including a plasticizer/promoter phase comprising said primary plasticizer, said adhesion promoter, and an effective amount of a secondary plasticizer nonionic solvent effective in solvating said adhesion promoter in said plasticizer/promoter phase, said plasticizer/promoter phase being preformed and added to the remaining ingredients of said plastisol composition;

(b) applying an acid-catalyzed topcoat over said plastisol composition; and (c) heating said coated metal substrate to cure said plastisol composition and said topcoat.

2. The method of claim 1 wherein said plastisol composition on said metal substrate is heated for its curing prior to applying said topcoat thereto.

3. The method of claim 1 wherein said secondary plasticizer nonionic solvent is selected from the group consisting of monoisopropyl biphenyl, diethylene glycol monoethyl ether, diisopropyl biphenyl, phenylxyleyl ethane, butylated biphenyl, and mixtures thereof.

4. The method of claim 2 wherein said secondary plasticizer nonionic solvent is selected from the group consisting of monoisopropyl biphenyl, diethylene glycol monoethyl ether, diisopropyl biphenyl, phenylxyleyl ethane, butylated biphenyl, and mixtures thereof.

5. The method of claim 1 wherein the proportion of secondary plasticizer ranges from between about 10 to 70 weight parts, said primary plasticizer ranges from between about 20 ad 200 weight parts, and said promoter ranges from between about 1 and 10 weight parts, all weight parts based on 100 weight parts of said vinyl chloride polymer.

6. The method of claim 2 wherein the proportion of secondary plasticizer ranges from between about 10 to 70 weight parts, said primary plasticizer ranges from between about 20 ad 200 weight parts, and said promoter ranges from between about 1 and 10 weight parts, all weight parts based on 100 weight parts of said vinyl chloride polymer.

* * * * *

UNITED STATES PATENT AND TRADEMARK OFFICE
CERTIFICATE OF CORRECTION

PATENT NO.  : 4,824,700

DATED       : April 25, 1989

INVENTOR(S) : Don S. Wozniak

It is certified that error appears in the above-identified patent and that said Letters Patent is hereby corrected as shown below:

Column 2, line 65: "(wet-on-dry)" should read as --(wet-on-wet)--

Column 3, line 28: "modeate" should read as --moderate--

Column 4, line 4: "is" should read as --or--

Column 4, line 18: "subsrate" should read as --substrate--

Column 5, line 31: "93.600" should read as --93,600--

Column 5, line 53: "or" should read as --on--

Column 5, line 66: "higher" should read as --high--

Column 6, line 26: "3.40" should read as --3.80--

Column 8, line 26: "3.725" should read as --3.72--

Column 8, line 39: "wet-on-wet baking" should read as --wet-on-wet with baking--

Column 9, line 38: "3.480" should read as --3,480--

Column 11, line 19: "polyimidazole" should read as --polyimidazoline--

Column 12, line 53: "whidh" should read as --which--

Column 14, line 5, Claim 5: "to" should read as --and--

UNITED STATES PATENT AND TRADEMARK OFFICE
CERTIFICATE OF CORRECTION

PATENT NO. : 4,824,700
DATED : April 25, 1989
INVENTOR(S) : Don S. Wozniak

It is certified that error appears in the above-identified patent and that said Letters Patent is hereby corrected as shown below:

Column 14, line 7, Claim 5: "ad" should read as --and--

Column 14, line 13, Claim 6: "to" should read as --and

Column 14, line 15, Claim 6: "ad" should read as --and--

Signed and Sealed this

Twenty-fourth Day of November, 1992

Attest:

DOUGLAS B. COMER

*Attesting Officer*     *Acting Commissioner of Patents and Trademarks*